(12) United States Patent
Munz et al.

(10) Patent No.: US 7,437,943 B2
(45) Date of Patent: Oct. 21, 2008

(54) FORCE MEASUREMENT ELEMENT

(75) Inventors: Michael Munz, Reutlingen (DE); Kurt Weiblen, Metzingen (DE); Andreàs Stratmann, Gomaringen (DE); Anton Dukart, Gerlingen (DE); Helmüt Grutzeck, Maehringen (DE); Johann Wehrmann, Balingen (DE); Conräd Haeussermann, Sonnenbuehl (DE); Klaus Kasten, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/555,933

(22) PCT Filed: Mar. 12, 2004

(86) PCT No.: PCT/DE2004/000493

§ 371 (c)(1),
(2), (4) Date: Jan. 19, 2007

(87) PCT Pub. No.: WO2004/099746

PCT Pub. Date: Nov. 18, 2004

(65) Prior Publication Data

US 2007/0107531 A1    May 17, 2007

(30) Foreign Application Priority Data

May 7, 2003   (DE) ............................... 103 20 575
Jul. 25, 2003  (DE) ............................... 103 33 992

(51) Int. Cl.
*G01N 3/20* (2006.01)

(52) U.S. Cl. .................... 73/849; 73/862.629

(58) Field of Classification Search ...............
73/862.621–862.642, 849
See application file for complete search history.

(56) References Cited

U.S. PATENT DOCUMENTS

| 2,859,613 | A |   | 11/1958 | Green |
|---|---|---|---|---|
| 3,180,139 | A |   | 4/1965 | Soderholm |
| 3,837,222 | A | * | 9/1974 | Raskin .................. 73/862.637 |
| 3,927,560 | A | * | 12/1975 | Farr ...................... 73/862.633 |
| 3,969,934 | A | * | 7/1976 | Raskin .................. 73/862.637 |
| 4,103,545 | A | * | 8/1978 | Rykwalder et al. ..... 73/862.382 |
| 4,128,001 | A | * | 12/1978 | Marks ........................ 73/1.15 |
| 4,181,011 | A | * | 1/1980 | Brendel ................. 73/862.633 |
| 4,467,661 | A | * | 8/1984 | Somal .................. 73/862.382 |
| 4,649,759 | A | * | 3/1987 | Lee ........................ 73/862.626 |
| 4,655,305 | A |   | 4/1987 | Jacobson |
| 4,657,097 | A | * | 4/1987 | Griffen ........................ 177/211 |
| 4,724,351 | A | * | 2/1988 | EerNisse et al. ............. 310/328 |
| 5,293,007 | A | * | 3/1994 | Darst et al. ................. 177/229 |
| 5,339,699 | A |   | 8/1994 | Carignan |
| 5,367,217 | A | * | 11/1994 | Norling ..................... 310/370 |
| 5,538,228 | A | * | 7/1996 | Schiel ......................... 267/73 |
| 6,166,336 | A | * | 12/2000 | Odiet .................... 177/210 R |
| 6,981,945 | B1 | * | 1/2006 | Sarvazyan et al. ........... 600/131 |

(Continued)

FOREIGN PATENT DOCUMENTS

DE          37 02 271         8/1988

(Continued)

*Primary Examiner*—Max Noori
(74) *Attorney, Agent, or Firm*—Kenyon & Kenyon LLP

(57) ABSTRACT

A force measurement element measures an introduced force by means of a double flexural beam and a displacement sensor. The double flexural beam makes possible a double spring shape that makes possible an optimization with regard to elongation distribution.

10 Claims, 4 Drawing Sheets

U.S. PATENT DOCUMENTS

2003/0097887 A1 * 5/2003 LaVar .................. 73/862.639

FOREIGN PATENT DOCUMENTS

| DE | 41 27 460 | 2/1993 |
| EP | 0 299 738 | 1/1989 |
| JP | 2502568 T | 8/1990 |
| JP | 4085658 | 3/1992 |
| JP | 200214008 | 8/2000 |
| JP | 2001221699 | 8/2001 |
| WO | WO88/07182 | 9/1988 |

* cited by examiner

FORCE MEASUREMENT ELEMENT

BACKGROUND INFORMATION

A flexural force sensor is described in German Patent Application No. DE 37 02 271.

SUMMARY OF THE INVENTION

The force measurement element according to the present invention has, in contrast thereto, the advantage that the flexural element has a double flexural beam that implements one spring shape per beam, the double flexural beam being retained at one end and force introduction occurring perpendicular to the longitudinal direction of the double flexural beam. The elongation distribution under load in the force measurement direction is thus optimal, and the overall configuration is moreover minimized. Because of the shape selected, in the other spatial directions the force measurement element is insensitive to damage due to loads not acting in force measurement directions. The spring shape is embodied in such a way that the elongation distribution and force measurement direction are optimal; in other words, a large deflection can be achieved without mechanical failure of the material. The failure criterion used here can be, for example, the elastic elongation limit or the continuous load-bearing capacity.

It is particularly advantageous that the double flexural beam can be fabricated from square or rectangular or circular or semicircular original materials. The spring shape can be produced with an opening and with a wedge tapering toward the center of the spring. The spring shape itself is optimized so that moments and transverse forces bring about the most homogeneous possible stress distribution at the surface under the action of a load in the measurement direction. For that purpose, the spring shape is embodied in the form of a double wedge tapering toward the center, bringing about a homogeneous distribution of the elongation maxima. The attachment radii are adapted in terms of shape, and represent a curve profile that is optimized in terms of its elongation distribution and makes possible a particularly homogeneous transition from the high-load region to the low-elongation original material. The double-wedge spring shape brings about a very homogeneous distribution of the maximum elongations acting in the spring region. The result is that, in particular when measuring forces for which deflection or displacement is being measured, a maximum displacement is achieved for a predefined force without exceeding the elongation permissible in the material. To achieve this optimal distribution of elongations, the geometric parameters of the force measurement element are coordinated with one another. Finite element calculations, for example, can be used here. In springs made of original materials having a rectangular or semicircular cross section, the outer tapers can be omitted. What is important is that the spring tapers homogeneously in the center region. A slight deviation from the straight-line shape can yield an additional (albeit slight) improvement in stress distribution. Transitions can also be adapted accordingly. What is important here is that this shape correspond approximately to an elliptical shape that transitions, without (or almost without) any abrupt change in slope, into the spring and into the base of the original material.

A displacement sensor is advantageously used as the measurement system. The displacement sensor can advantageously be located at the rotation point of the tilting motion. It is therefore possible, upon loading of the flexural beam with a moment in the X direction, for the sensor to be rotated only about the X axis, but for no deflection in the Z direction to occur; there is therefore no undesired measured signal upon loading of the flexural beam with a torque about the X axis. The double flexural beam itself permits a suppression of the transverse forces Fx and Fy and the moments Mz and My, since it is considerably stiffer under these loads.

An inductive measurement system can be used as the displacement sensor, for example by the use of a Hall element; a magnetic-field-generating reference, and the Hall element constituting the magnetic-field-sensitive element, can be used. It is also possible, alternatively, to make measurements optically or capacitatively. Force can preferably be introduced via a sleeve. Otherwise it is advantageous to introduce the force at the end of the flexural beam. The displacement sensor can be guided to the optimum measurement location by way of bar-shaped extensions of the beam ends. It is also possible, however, to guide the displacement sensor to the optimum measurement location via a mount on the sleeve and a bar on the retained base end of the beam.

The embodiment of the flexural beam can also, in the context of the measurement principle, be a different spring shape, and not necessarily a double spring, so that a single spring, or three or more parallel springs, are possible with this measurement principle according to the present invention. In these cases as well, the above-described moment insensitivity with respect to Mx exists as a result of selection of the optimum location for the displacement measurement system.

DETAILED DESCRIPTION

In known force sensors that utilize the bending of a flexural sensor, strain gauges or piezoresistive structures are applied in order to measure the elongation of the flexural element, or the deflection of flexural elements is sensed using displacement-measuring systems. Known shapes of the flexural elements are S-shaped or bar-shaped elements. These elements have, however, a constant cross section. A disadvantage of these shapes is the inhomogeneous elongation distribution upon loading in the measurement direction, and (associated therewith) a large overall configuration.

The present invention provides a spring shape that makes possible an optimum elongation distribution upon loading in the force measurement direction. The overall configuration is thereby minimized, whereas in the other directions, as a result of the shape selected, the force measurement element is insensitive to damage as a result of loads.

The force measurement element is intended to be used in particular in motor vehicles. Utilization as weight measurement sensors in vehicle seats is preferably envisioned.

Figure 1:
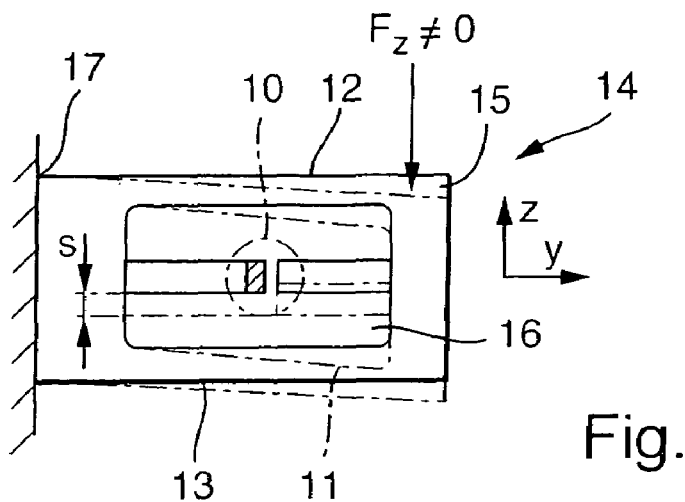
FIG. 1 is a first schematic depiction of the force measurement element according to the present invention.

FIG. 1 shows force measurement element 14 according to the present invention in a side view. Force measurement element 14 has an opening 16 that is surrounded in the longitudinal direction by two springs 12 and 13 that in this case are flexural beams. Force is introduced at the end of the flexural beam, at location 15, in the Z direction. FIG. 1 indicates a coordinate system in which the Z direction is transverse to flexural beam 14, whereas the longitudinal direction is represented by the Y axis. Double flexural beam 14 is retained at one end on a wall 17, for example by means of a joining technique or a threaded connection. Disposed in the opening are two oppositely located semi-beams on which measurement system 10 sits. A displacement sensor, in which e.g. a Hall sensor is used as the measurement element and a magnet as the reference, is used here by way of example. Further sensors are alternatively or additionally possible. These include, for example, strain gauges.

The dashed lines indicate what happens when force is introduced in the Z direction. The unretained end of the double flexural beam is pushed downward, so that measurement system 10 on the semi-beams senses a change in displacement. The change in displacement is labeled here with a lower-case "s".

Figure 2:
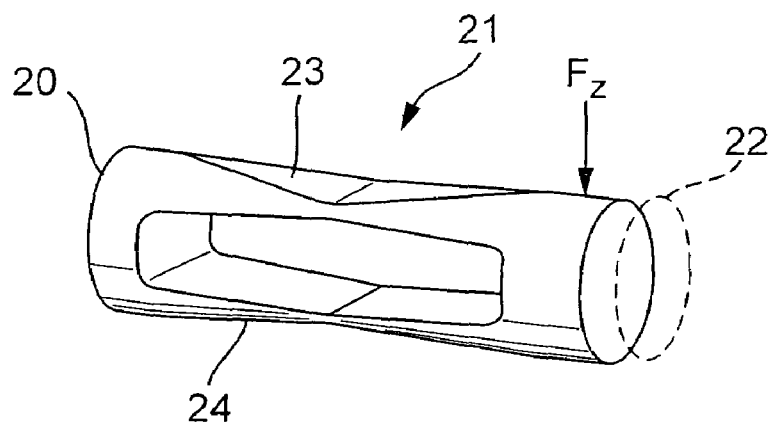
FIG. 2 is a first schematic depiction, in perspective, of the force measurement element according to the present invention.

FIG. 2 schematically depicts the double flexural beam according to the present invention. Double flexural beam 21 is retained at point 20, either (as presented above) by a thread or a material join, or by a continuation of the round material from which the flexural beam is fabricated. Spring shapes 23 and 24 around the opening are wedge-shaped here, and taper toward their centers. The double flexural beam here has a circular cross section 22. Here and also hereinafter, the displacement sensor assemblage is omitted for the sake of simplicity.

Figure 3:
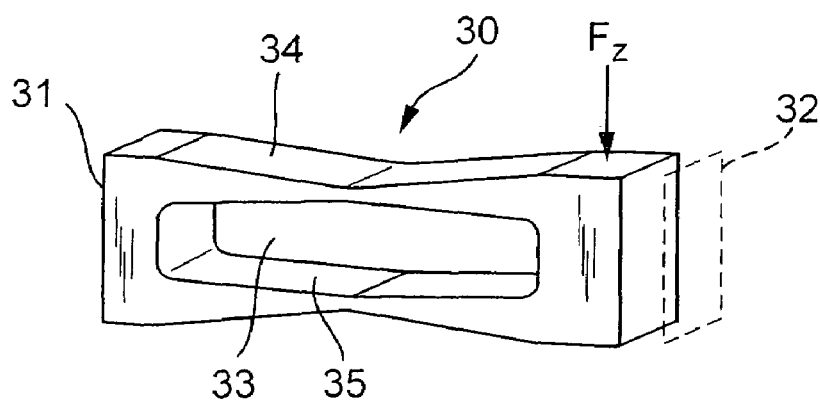
FIG. 3 is a second perspective depiction of the force measurement element.

FIG. 3 is a further schematic depiction of the double flexural beam according to the present invention. Double flexural beam 30 is once again retained at point 31, and here has a rectangular or square cross section 32. Spring shapes 34 and 35, which here again taper in wedge-shaped fashion toward the center, are once again disposed around opening 33.

Figure 4A:
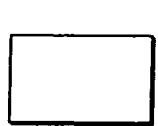
FIGS. 4a-4d show various cross-sectional shapes of the force measurement element.
Figure 4B:
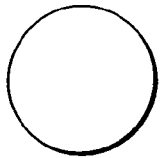
Figure 4C:
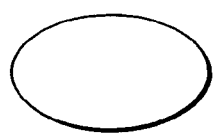
Figure 4D:
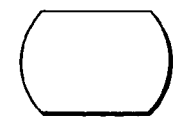

FIGS. 4a-4d combine the various cross sections for the double flexural beams. FIG. 4a indicates the rectangular cross section, the square cross section being a special form of this cross section. FIG. 4b indicates the circular cross section, and FIG. 4c the elliptical. FIG. 4d shows a semicircular cross section, i.e. the cross section has circular arcs but also straight delimiting lines.

Figure 5A:
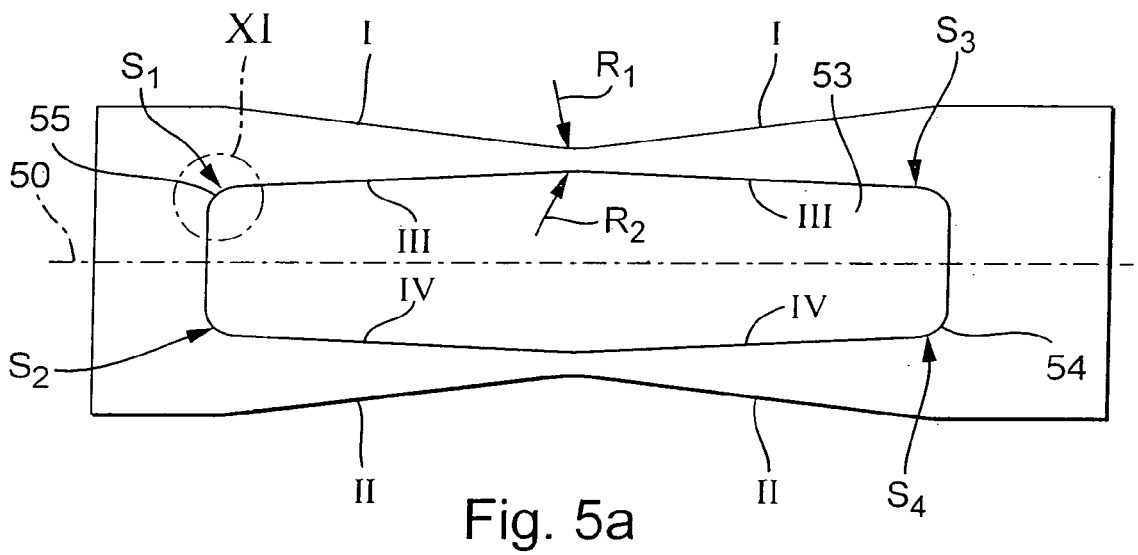
FIGS. 5a and 5b are two further side views of the force measurement element according to the present invention.
Figure 5B:
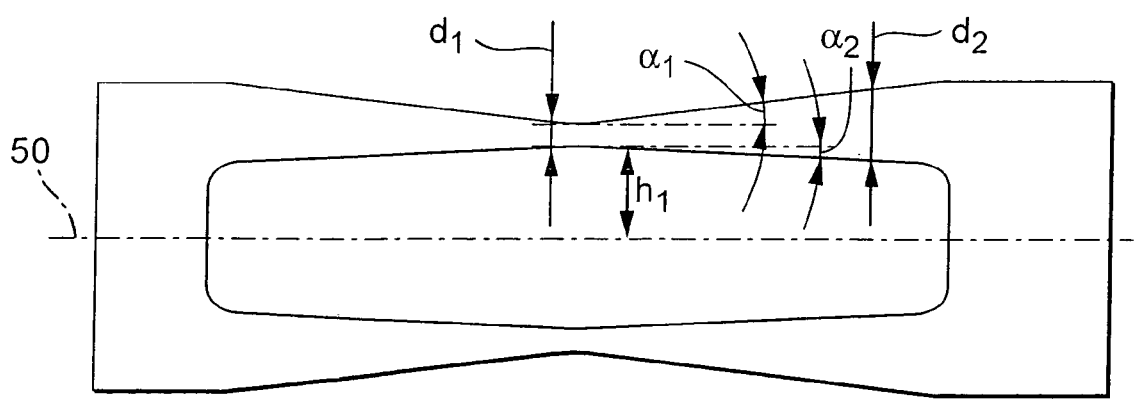

FIG. 5a is a further side view of the flexural beam according to the present invention, another also being indicated in FIG. 5b. Axes of symmetry 50 are drawn through these side views. The spring shape, and the parameters with which the spring shape is determined, are of particular concern here. Outer constrictions I and II, as well as inner constrictions III and IV, are indicated here. These constrictions taper off in each case toward the center of the springs. On the upper spring, the center points are labeled R1 for the outer and R2 for the inner. Transitions 54, 55 in the corners of opening 53 are also optimized here in such a way that the stress distribution is homogeneously distributed. The transitions are labeled S1, S2, S3, and S4 here, and details are discussed in FIG. 6.

FIG. 5b once again shows the double flexural beams in a side view, indicating further parameters for defining the double flexural beam, in particular the spring shape. The diameter of the spring at the thinnest point, i.e. at the center where it is maximally constricted, is indicated as d1; d2 designates a diameter in the outer region of the spring, i.e. where it is as thick as possible. Both $\alpha 1$ and $\alpha 2$ designate taper angles. The parameter h1 indicates the maximum distance between the inner side of the opening at the thinnest point and the axis of symmetry. Optimization is accomplished by computerized optimization, in particular with the assistance of a finite element calculation.

Figure 6:
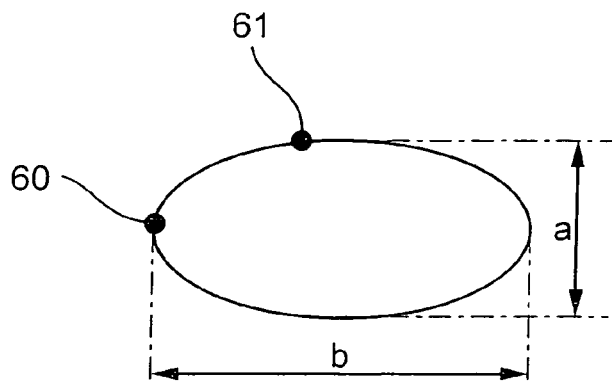
FIG. 6 shows one form of the spring shape transition.

FIG. 6 shows the form of the spring shape transition. Transitions S1, S2, S3, and S4 are optimized in such a way that at point 60, the transition into the original material, i.e. the raw material, takes place with no discontinuity in slope. The transition is furthermore optimized in such a way that at point 61, the transition into the spring, i.e. into the beam, also takes place with no discontinuity in slope. The overall result is therefore an elliptical shape for the opening, with diameters A and B. The fact that an ellipse is created requires that diameter A be smaller than diameter B. The shape can be approximated mathematically as splines, polynomially, parabolically, by means of two radius sections of different size that may have small straight-line segments in between, or directly as an elliptical function. The conformation without a discontinuity in slope allows a space-saving overall configuration, since stress concentrations caused by excessive elongations do not occur.

Figure 7:
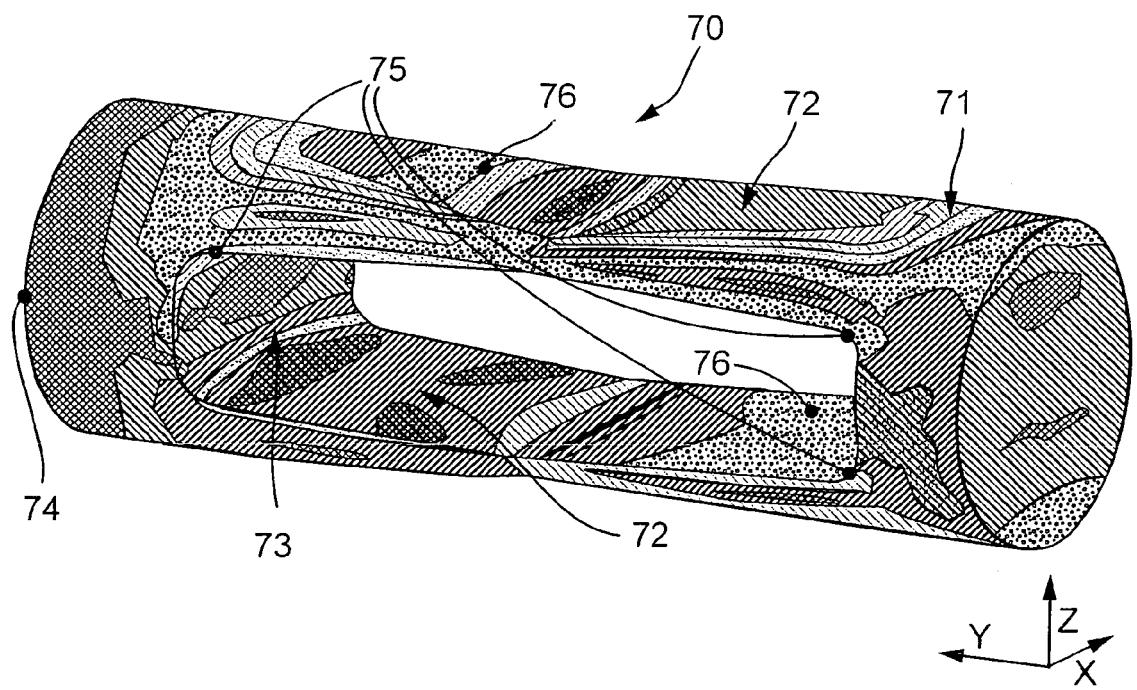
FIG. 7 is a perspective depiction of the force measurement element, highlighting regions of high elongation.

FIG. 7 is a perspective depiction showing double flexural beam 70 with a plot of stress distributions in the context of an introduced force. Force 71 is introduced at the free end of the flexural beam. The flexural beam is retained at one end at location 74. Point 73 indicates, by way of example, a transition from the high-elongation region into the low-elongation region with no discontinuities in elongation.

The elongation profile for the other transitions 75 is not visible in the depiction selected, but it also proceeds with no discontinuity in elongation. At points 72, a homogeneous distribution of the stresses in the spring is apparent. The double-wedge spring shape results in a very uniform distribution of the maximum elongations acting in the spring region. Upon introduction of the force in the opposite direction, the maximum elongations act with a homogeneous distribution at regions 76. The result, in particular for force measurement principles that measure deflection or displacement, is to achieve a maximum displacement for a predefined force without exceeding the elongation permissible in the material. What is important is that the spring tapers uniformly in the center region.

Figure 8:
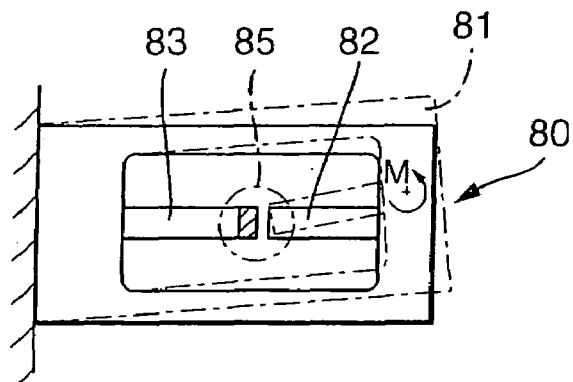
FIG. 8 is a further side view of the force measurement element with a displacement sensor.

FIG. 8 shows an independence of double flexural beam 80 in the context of a moment introduced about the X axis, i.e. into the paper surface, since in response to this torque the flexural beam moves into position 81 but no offset occurs at measurement location 85. This is achieved by appropriate positioning of measurement location 85. Measurement location 85 is positioned, by means of a bar 83 attached to the beam end, in such a way that a deflection at the beam end as a result of a moment generates no offset at the measurement location. The displacement sensor in the opening will thus generate no signal. A decoupling with respect to the moment Mx therefore exists. Instead of bar shapes, other physical shapes that ensure appropriate positioning of the measurement location can also be selected. With the tapering spring, the positioning point can be identified by FEM simulations. For simple spring shapes, this can be done via analytical calculations.

Figure 9:
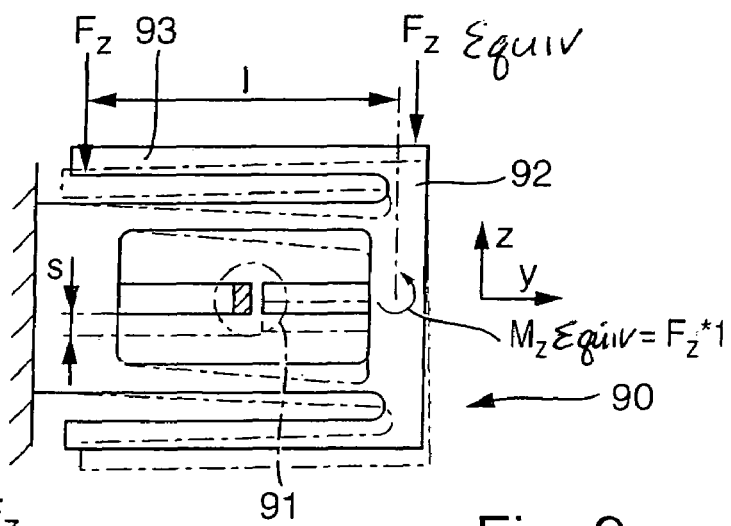
FIG. 9 is a side view of the force measurement element with a sleeve.

FIG. 9 shows a further embodiment in a side view. Here a sleeve is used. Double flexural beam 90 in this case has an additional sleeve 92 for the introduction of force. In this case the force $F_z$ is applied onto sleeve region 93. The force $F_{z\ equiv}$ and the moment $M_{x\ equiv}=F_z*1$ serve only for consideration of this load situation; they do not act together, but only in isolation as an equivalent force and equivalent moment in order to explain the decoupling effect. In other words, the deformation of the deflection element is identical, when considered theoretically, for the load situation $F_z$ alone and for the equivalent load situation $F_{z\ equiv}$ with moment $M_{x\ equiv}$ (slight discrepancies may occur in practice, for example, as a result of production inaccuracies). The dashed line shows the change in the double flexural element under the load situation $F_z$ alone and in response to the equivalent load situation $F_{z\ equiv}$ with moment $M_{x\ equiv}$. Once again an offset occurs that is sensed by measurement device 91, i.e. the displacement sensor. The moment that is applied as a result of the introduction of force via the sleeve is, however, suppressed by way of the disposition. This is in accordance with the superposition principle, known in mechanics, according to which individual load situations can be combined with one another, and the deflections can be added linearly. This applies only to small deflections, although they are what is assumed here. This therefore means that the deflections of load situation $F_{z\ equiv}$ with $M_{x\ equiv}$ together can be regarded as the sum of the load situations $F_{z\ equiv}$ acting alone and $M_{x\ equiv}$ acting alone. As explained above with reference to FIG. 8, $M_{x\ equiv}$ therefore does not cause any deflection at measurement location 85, but $F_{z\ equiv}$ certainly does cause a deflection in the Z direction at the measurement location corresponding to that resulting from $F_z$. In other words, the introduction of the force signal is independent of the position of force $F_z$ provided the latter acts perpendicular to the sleeve axis. This applies, of course, only if the measurement location has been correspondingly placed, by means of FEM or analytical calculations, at the location that is insensitive to the moment $M_{x\ equiv}$.

Figure 10:
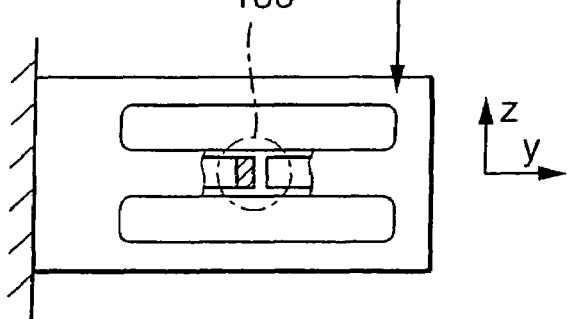
FIG. 10 shows a triple spring system.

FIG. 10 shows that the measurement principle with the displacement sensor also functions in the case of a triple spring. Here as well, the force $F_z$ is introduced into the flexural beam at the free end. Located in a cutout in the center spring is displacement sensor 100 having the bars described in FIG. 8, which are applicable both here and in the case of a single spring (shown in FIG. 11). Measurement system 100 for measuring the deflection in the Z direction is located in a cutout in the center spring.

Figure 11:
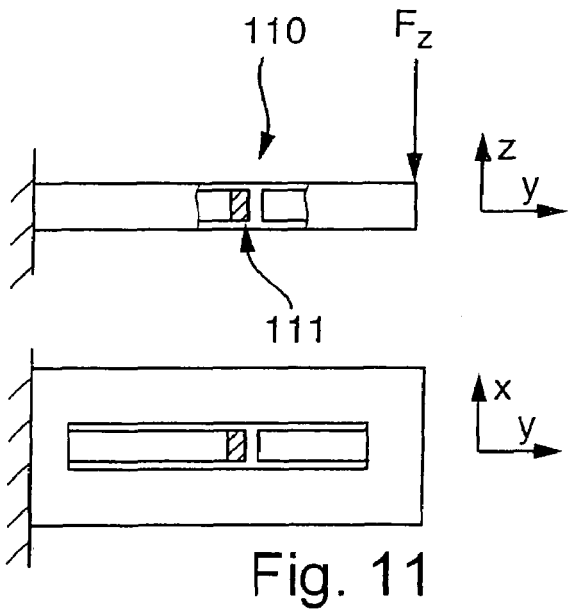
FIG. 11 shows a single spring system.

FIG. 11 shows utilization in the case of a single spring 110, which here again has measurement system 111 with bars, as described in FIG. 8, in a cutout. FIG. 11 shows a side view and plan view.

What is claimed is:

1. A force measurement element comprising:
   a flexural element for force measurement, the flexural element including a double flexural beam that implements one spring shape per beam, the double flexural beam being retained at one end, and force introduction occurring substantially perpendicular to a longitudinal direction of the double flexural beam, wherein the spring shape is configured in such a way that it forms a wedge tapering toward a center of a spring.

2. The force measurement element according to claim 1, wherein a cross section of the force measurement element is one of rectangular, circular, elliptical, and semicircular.

3. The force measurement element according to claim 1, wherein the spring shape is embodied in such a way that it forms an opening on the double flexural beam.

4. The force measurement element according to claim 1, wherein an opening and the spring shape are configured in such a way that at transitions the opening defines an elliptical shape.

5. The force measurement element according to claim 1, further comprising a displacement sensor for measurement of a force.

6. The force measurement element according to claim 5, wherein the displacement sensor is situated at a rotation point of a tilting motion.

7. The force measurement element according to claim 5, wherein the displacement sensor has a magnetic-field-generating reference and a magnetic-field-sensitive measurement element.

8. The force measurement element according to claim 5, wherein the displacement sensor is embodied one of optically and capacitatively.

9. The force measurement element according to claim 1, further comprising a sleeve for force introduction.

10. A force measurement element comprising:
    a flexural element for force measurement, the flexural element including a double flexural beam that implements one spring shape per beam, the double flexural beam being retained at one end and free at an opposite end, and force which is measured by the flexural element occurring substantially perpendicular to a longitudinal direction of the double flexural beam causing displacement of the free end with respect to the retained end in the perpendicular direction, wherein the spring shape is configured in such a way that it forms a wedge tapering toward a center of a spring.

* * * * *